June 23, 1964 — E. GOTO — 3,138,723
DYNAMIC STORAGE CIRCUIT UTILIZING TWO TUNNEL DIODES AND REFLECTIVE DELAY LINE
Filed Nov. 1, 1960
Fig. 1
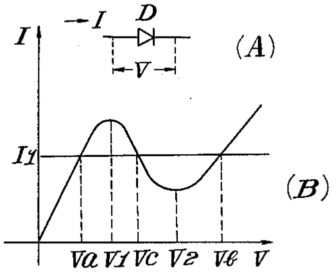
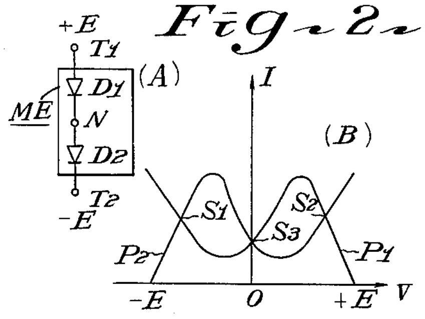
Fig. 3
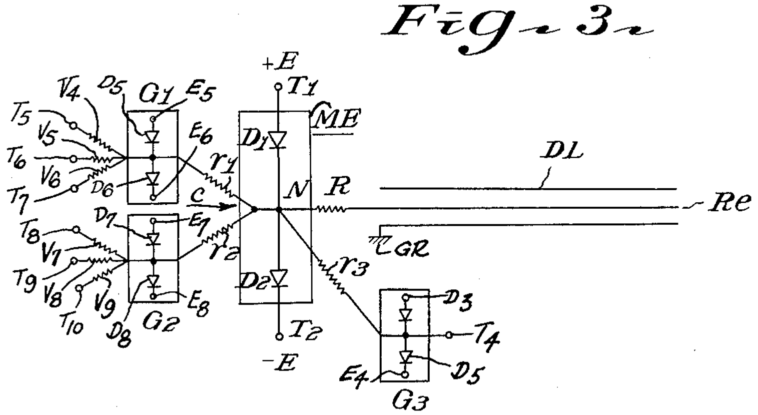
Fig. 4
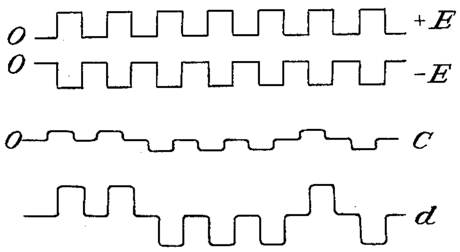

3,138,723
Patented June 23, 1964

3,138,723

DYNAMIC STORAGE CIRCUIT UTILIZING TWO TUNNEL DIODES AND REFLECTIVE DELAY LINE

Eiichi Goto, Meguro-ku, Tokyo-to, Japan, assignor to Zaidan Hojin Parametron Kenkyujo (known as Parametron Institute), Tokyo-to, Japan Filed Nov. 1, 1960, Ser. No. 66,562
Claims priority, application Japan Nov. 23, 1959
6 Claims. (Cl. 307—88.5)

The present invention relates to memory circuits and more particularly to an improved dynamic storage circuit utilizing two negative resistance elements such as tunnel diodes and a reflective delay line.

A principal object of the present invention is to provide an improved memory circuit of the type described above which is capable of carrying out very stable and high speed operation in spite of low cost of the circuit construction.

The principles, construction, and operation of the circuit of the present invention as well as other objects and advantages of the circuit will be understood fully from the following description taken in connection with the accompanying drawing, in which the same or equivalent members are designated by the same references, and in which:

FIG. 1(A) and FIG. 2(A) are diagrams of elements for describing the principle of the present invention;

FIG. 1(B) and FIG. 2(B) are respectively diagrams illustrating the characteristic curves of the elements of FIG. 1(A) and FIG. 2(A) for describing the principle of the present invention;

FIG. 3 is a circuit diagram of one example of the present invention;

FIG. 4 is a diagram of wave forms for describing the operation of the circuit of FIG. 3.

Referring to FIG. 1, the characteristic curve of the electric current I and electric voltage V of a negative resistance element D (such as a tunnel diode) of FIG. 1(A) is shown in FIG. 1(B). In this curve, the section between the voltage $V_1$ and $V_2$ corresponds to the negative resistance range. As will be understood from the characteristic curve, the current I is a multivalued function of the voltage V, as shown by V*a*, V*b* and V*c*. In other words, the diode D assumes a negative resistance character of the dynatron type. Referring now to FIG. 2(A), in which a memory element ME illustrated consists of two negative resistance elements $D_1$ and $D_2$ which are connected in series in the same polarity. When two pulsed voltages +E and −E which are reverse in polarity and equal in magnitude are applied respectively, to the terminals $T_1$ and $T_2$ of the memory element ME and a ground terminal, not shown, the characteristic curve $P_1$ of the diode $D_1$ becomes symmetrical to the characteristic curve $P_2$ of the diode $D_2$, and three cross points $S_1$, $S_2$, and $S_3$ are obtained. Since the points $S_1$ and $S_2$ are stable positions, and the point $S_3$ is an unstable position, the potential of a mid point N of the memory element ME will flip toward the negative or positive section in accordance with the polarity of a minor voltage applied to the mid point N and will settle at the point $S_1$ or $S_2$.

In other words, a series connected pair of tunnel diodes, $D_1$ and $D_2$ of FIG. 2, is capable of amplifying and memorizing one binary digit by applying symmetrical voltage pulses +E and −E thereto. Specifically +E is applied to $T_1$ and −E is applied to $T_2$ in FIG. 2. Moreover, the binary digit or conditions ("1" and "0") will be represented by the polarity, positive or negative, of the voltage at point N in FIG. 2 rather than the presence or absence of a voltage. This circuit may be called a tunnel diode pair circuit and pair circuit configurations are used as gate circuits $G_1$, $G_2$ and $G_3$ in FIG. 3 as hereinafter described.

According to the present invention, the memory element such as shown in FIG. 2(A) is combined with a signal delay line such as an electromagnetic delay line circuit, whereby a memory apparatus which is low in cost, simple in construction, and stable and very high speed in operation is obtained.

In FIG. 3 is shown an embodiment of the present invention, wherein a mid point N of a memory element ME as shown in FIG. 2(A) is coupled to a conventional reflective electromagnetic delay line DL having a reflecting end $R_e$, for instance, through a coaxial cable and through a resistance R. The mid points of two gating circuits $G_1$ and $G_2$ are connected to the input side of the memory element ME, respectively, through resistors $r_1$ and $r_2$, and the mid point of the other gating circuit $G_3$ is connected to the output side of the memory element ME through a resistor $r_3$. In each of these gates the voltage pulses applied thereto are always assumed to be opposite in polarity and equal in magnitude, i.e., $E_4=-E_3$, $E_6=-E_5$ and $E_8=-E_7$. Binary information will always be represented by the polarity of the voltage at the mid point of each pair circuit of the gate circuits $G_1$, $G_2$ and $G_3$.

The wave forms for describing the principle of the operation of the present invention are shown in FIG. 4. In the circuit of FIG. 3, when positive and negative voltage pulses +E and −E which are symmetrical to each other as shown in FIG. 4 are, respectively, applied to the terminals $T_1$ and $T_2$, and an input voltage pulse C such as shown in FIG. 4 is applied to the input side of the memory element ME through the gating circuits $G_1$ and $G_2$, the input pulse voltage being synchronous with the pulse voltages +E and −E, the potential of the mid point N of the memory element ME settles at the stable point $S_1$ or $S_2$ in accordance with the polarity of the input voltage pulse existing at the mid point N at the time when the pulse voltages +E and −E are applied, respectively, to the terminals $T_1$, GR and $T_2$ and GR as described in connection with FIG. 2. Accordingly, the potential of the mid point N is sent out, as the amplified, modulated voltage pulse *d* as shown in FIG. 4, into the delay line DL through the resistor R.

The voltage pulse *d* applied to the delay line DL propagates to the reflecting end $R_e$ and then is fed back to the mid point N after reflection at said end $R_e$. In this case, if the input voltage pulses from the gating circuits $G_1$ and $G_2$ are equal in magnitude and reverse in polarity, the voltages will cancel each other, so that the potential at the point N is established only by the reflected voltage pulse, and this potential is again sent out into the delay line with the polarity corresponding to the polarity of the reflected voltage pulse after having been amplified and modulated per period of the clock pulse voltages +E and −E. Accordingly, the binary information signal written in the form of polarity of the pulse voltage is repeatedly memorized while being amplified and modulated as long as the polarity of the input pulse voltage from the gating circuit $G_1$ is reverse to that from the gating circuit $G_2$. The reading-out of the memorized information signal can be carried out by opening the gating circuit $G_3$. The circuit $G_3$ is used as an amplifier and the output thereof can be taken out from a terminal $T_4$ without causing any harmful loading to the memory element ME.

When the memorized information is to be erased and a new information signal is to be written, it is only necessary to make the input voltage pulse applied to the mid point N of the memory element ME larger than the reflected voltage pulse by making both of the polarities of the input signals from the gating circuits $G_1$ and $G_2$ positive or negative, whereby the memorized information signal is erased and an information signal corresponding to the polarity of a new information can be written without relation to the polarity of the reflected pulse voltage. More specifically, input signal C of positive polarity is applied to the mid point N by making both circuits $G_1$ and $G_2$ send out positive signals from their respective mid points. This may be accomplished by further applying positive signals to at least two of the terminals $T_5$, $T_6$ and $T_7$ and at least two of the terminals $T_8$, $T_9$ and $T_{10}$, provided resistors $V_4$, $V_5$, $V_6$, $V_7$, $V_8$, $V_9$, connected to the mid points of the circuits $G_1$ and $G_2$ as illustrated, are substantially of equal value. In other words, the circuits $G_1$ and $G_2$ may be used as majority logic gates to perform the control of inputs to the memory element ME. Accordingly, writing-in and reading-out of binary digits can be effectively attained by making positive and negative polarities correspond, respectively, to conditions "1" and "0."

In this invention, extremely high speed operation can be attained by using tunnel diodes as the negative resistance elements.

According to my experiment, a memory device of 14 binary digit memory at 30 mc. clock was constructed by using a cable having a length of about 30 meters and having a characteristic resistance of 75Ω. By using germanium tunnel diodes, this device operated with high stability.

As will be understood from the above description, according to the present invention, a very stable and precise memory device which can operate at an extremely high speed can be constructed at a very low cost, because it can be constructed by a simple combination of two negative resistance elements and a signal delay line, for example an electromagnetic reflective delay line circuit.

What I claim is:

1. A dynamic storage circuit comprising, in combination, a reflective delay line, a memory element connected to said delay line, said memory element comprising two negative resistance elements connected in series in the same polarity, said negative resistance elements having substantially the same characteristics and in which current flowing therein in operation is a multivalue function of voltage applied thereto, means for developing a voltage of opposite polarities intermediate said negative resistance elements in which the voltage polarity is representative of binary conditions "0" and "1" comprising, means comprising connections for simultaneously applying to said negative resistance elements two clock voltages of equal magnitude, one of said voltages comprising positive pulses and the other comprising negative pulses in phase with said positive pulses, the last-mentioned means comprising connections for applying one of said clock voltages to one negative resistance element and connections for applying the other clock voltage to the other negative resistance element, and means connected intermediate said negative resistance elements coupling said memory elements to said delay line at an end other than the reflective end thereof, whereby said voltage developed intermediate said negative resistance elements is applied to said delay line and is reflected back to said memory element and is amplified and reproduced at each clock period determined by said clock voltages.

2. A dynamic storage circuit comprising, in combination, a reflective delay line, a memory element connected to said delay line, said memory element comprising two negative resistance elements connected in series in the same polarity, said negative resistance elements having substantially the same characteristics and in which current flowing therein in operation is a multivalue function of voltage applied thereto, means for developing a voltage of opposite polarities intermediate said negative resistance elements in which the voltage polarity is representative of binary conditions "0" and "1" comprising, means comprising connections for simultaneouly applying to said negative resistance elements two clock voltages of equal magnitude, one of said voltages comprising positive pulses and the other comprising negative pulses in phase with said positive pulses, the last-mentioned means comprising connections for applying one of said clock voltages to one negative resistance element and connections for applying the other clock voltage to the other negative resistance element, and means connected intermediate said negative resistance elements coupling said memory elements to said delay line at an end other than the reflective end thereof, and means comprising a connection for applying a control signal intermediate said negative resistance elements to variably control the polarity of said developed voltage, whereby said voltage developed intermediate said negative resistance elements is applied to said delay line and is reflected back to said memory element and is amplified and reproduced at each clock period determined by said clock voltages.

3. A dynamic storage circuit comprising, in combination, a reflective delay line, a memory element connected to said delay line, said memory element comprising two negative resistance elements connected in series in the same polarity, said negative resistance elements having substantially the same characteristics and in which current flowing therein in operation is a multivalue function of voltage applied thereto, means for developing a voltage of opposite polarities intermediate said negative resistance elements in which the voltage polarity is representative of binary conditions "0" and "1" comprising, means connecting said negative resistance elements for developing said developed voltage midpoint between said negative resistance elements, means comprising connections for simultaneously applying to said negative resistance elements two clock voltages of equal magnitude, one of said voltages comprising positive pulses and the other comprising negative pulses in phase with said positive pulses, the last-mentioned means comprising connections for applying one of said clock voltages to one negative resistance element and connections for applying the other clock voltage to the other negative resistance element, and means connected intermediate said negative resistance elements coupling said memory elements to said delay line at an end other than the reflective end thereof, a connection for applying a control signal to said midpoint between said negative resistance elements to control the polarity of said developed voltage, and the last-mentioned means comprising signal erasing means and signal write-in means.

4. A dynamic storage circuit comprising, in combination, a reflective delay line, a memory element connected to said delay line, said memory element comprising two negative resistance elements connected in series in the same polarity, said negative resistance elements having substantially the same characteristics and in which current flowing therein in operation is a multivalue function of voltage applied thereto, means for developing a voltage of opposite polarities intermediate said negative resistance elements in which the voltage polarity is representative of binary conditions "0" and "1" comprising, connections for simultaneously applying to said negative resistance elements two clock voltages of equal magnitude, one of said voltages comprising positive pulses and the other comprising negative pulses in phase with said positive pulses, and means connected intermediate said negative resistance elements connecting said memory elements to said delay line at an end other than the reflective end thereof, means comprising a connection for applying a control signal intermediate said negative resistance elements to control the polarity of said developed voltage, and output means connected to take out said voltage developed as an output.

5. A dynamic storage circuit comprising, in combination, a reflective delay line, a memory element connected to said delay line, said memory element comprising two negative resistance elements connected in series in the same polarity, said negative resistance elements having substantially the same characteristics and in which current flowing therein in operation is a multivalue function of voltage applied thereto, means for developing a voltage of opposite polarities intermediate said negative resistance elements in which the voltage polarity is representative of binary conditions "0" and "1" comprising, means connecting said negative resistance elements for developing said developed voltage midpoint between said negative resistance elements, means comprising, connections for simultaneously applying to said negative resistance elements two clock voltages of equal magnitude, one of said voltages comprising positive pulses and the other comprising negative pulses in phase with said positive pulses, the last-mentioned means comprising connections for applying one of said clock voltages to one negative resistance element and connections for applying the other clock voltage to the other negative resistance element, and means connected at said midpoint between said negative resistance elements coupling said memory elements to said delay line at an end other than the reflective end thereof.

6. A dynamic storage circuit according to claim 5, further comprising a connection for applying a control signal at said midpoint of said negative resistance elements to control the polarity of said developed voltage at will.

References Cited in the file of this patent

1960 Int. Solid-State Circuits Conf., Digest of Technical Papers, February 1960, pages 10–11, FIG. 7.